United States Patent [19]

Sünkel

[11] 4,452,097

[45] Jun. 5, 1984

[54] TUBULAR WINDOW DRIVE MECHANISM PARTICULARLY FOR MOTOR VEHICLES

[75] Inventor: Manfred Sünkel, Sonnefeld, Fed. Rep. of Germany

[73] Assignee: Brose Fahrzeugteile GmbH & Co. Kommanditgesellschaft, Coburg, Fed. Rep. of Germany

[21] Appl. No.: 386,990

[22] Filed: Jun. 10, 1982

[30] Foreign Application Priority Data

Jul. 16, 1981 [DE] Fed. Rep. of Germany ... 8120936[U]

[51] Int. Cl.³ .............................................. F16C 1/10
[52] U.S. Cl. ................................ 74/501 R; 74/501 P; 403/338; 285/406; 285/419
[58] Field of Search .......................... 74/501 R, 501 P; 285/234, 373, 419, 406, 383; 49/352; 403/338, 335; 24/249 LS, 249 R, 248 SA

[56] References Cited

U.S. PATENT DOCUMENTS

| | | | |
|---|---|---|---|
| 2,094,258 | 9/1937 | Thompson | 285/373 |
| 3,144,916 | 8/1964 | Lien | 74/501 R |
| 3,528,312 | 9/1970 | Nielson | 74/501 P |
| 3,985,041 | 10/1976 | Gilmore | 74/501 P |
| 3,997,198 | 12/1976 | Linder | 285/373 |

FOREIGN PATENT DOCUMENTS

| | | | |
|---|---|---|---|
| 68088 | 10/1940 | Czechoslovakia | 285/234 |
| 1525302 | 2/1966 | Fed. Rep. of Germany . | |
| 1931472 | 6/1969 | Fed. Rep. of Germany . | |
| 2812314 | 3/1978 | Fed. Rep. of Germany . | |
| 1300273 | 6/1962 | France | 24/459 |

OTHER PUBLICATIONS

IBM Technical Disclosure Bulletin, "Connector for Tubing" by R. E. Post, vol. 10, No. 4, Sep. 1967.

*Primary Examiner*—Kenneth Dorner
*Assistant Examiner*—Anthony W. Raskob, Jr.
*Attorney, Agent, or Firm*—Toren, McGeady and Stanger

[57] ABSTRACT

A window drive mechanism for motor vehicles including a driving cable operatively extending between a plurality of tubes each having adjoining ends with radially outwardy extending flared collars, the adjoining ends being connected together by a plastic clamping member which consists of two clamp halves adapted to receive therebetween said flared ends and being clipped together to connect said tubes with the clamp halves of the clamping member being each provided with an inner circumferential groove for receiving therein, respectively, the flared collars of the tubes.

8 Claims, 6 Drawing Figures

TUBULAR WINDOW DRIVE MECHANISM PARTICULARLY FOR MOTOR VEHICLES

The present invention relates generally to a tubular window raising mechanism which is particularly suitable for driving motor vehicle windows and more specifically to a drive mechanism having a driving cable which extends through a first and a second tubular member which adjoin each other wherein the adjoining ends of the tubes are attached by connecting means.

A tubular window actuating mechanism of this type is known in the prior art from German Offenlegungsschrift No. 1 525 302. In this mechanism, the guide tube extends between the drive source of the window raising mechanism and a window engaging member, and the guide tube encircles the driving cable. In order to avoid increasing the weight of the device and in order to provide greater assembly flexibility, the guide tube is divided into a first tube of flexible plastic material which commences from the driving unit and a second tube of metal which adjoins the first tube and which is partially slit. The metal tube serves as guidance means for an engaging member which is installed at the end of the driving cable.

The connecting part which connects these two tubes together is formed of a plastic sleeve which is sprayed on, glued on, or threadedly connected to the outer periphery of the plastic tube and which engages the metal tube in the form of a clamp wherein a rivet 34 provides clamp tension (see FIGS. 15-17 of the aforecited reference). In order to protect the metal tube from being pulled out of the plastic sleeve, the metal tube is provided with an outer groove 37 which is filled out by the rivet extending in the tangential direction when the connection is completed. However, since the metal tube is weakened by the groove, it is possible that during high axial loads which generate forces tending to remove the metal tube from the plastic tube, the metal tube may be pulled out of the plastic sleeve. Such forces occur during operation of the window raising mechanism due to curvature in the tubes. Additionally, it is possible that, particularly in a high-temperature environment, the end of the plastic tube may slide with respect to the plastic sleeve which surrounds it. Furthermore, the completed connection between the two tubes may only be released by breaking the riveted connection which may, for example, be necessary in order to exchange worn structural parts. After such an exchange has been effected, riveting must be again carried out.

In another tubular window raising mechanism of the same type known from German Auslegeschrift No. 1931 472, the connecting part is formed from a plastic sleeve which is sprayed around the plastic tube and from a sheet metal part which is attached or spot welded at the metal tube. This sheet metal part is riveted to lug-shaped projections of the plastic sleeve. In order to improve cohesion between the plastic sleeve and the plastic tube, the plastic tube is provided with circumferential grooves. However, at high temperatures and high axial loads, the plastic tube may slide with respect to the sleeve. Due to the requirement for sheet metal parts, this complicated type of connection of two tubes requires a relatively large structural space and a relatively high weight. Here again, in order to exchange one of the tubes, the riveting connection must first be loosened and riveting must then again be carried out.

A further prior art reference, German Offenlegungsschrift No. 28 12 314, discloses a combination of two tubes which are joined by spraying plastic on and around the two tube ends. In this reference, no means are provided for producing a reliable cohesion of the plastic and metal tubes, and in order to loosen the connection, the sprayed plastic sleeve must be destroyed.

Accordingly, the present invention is directed toward provision of a simply constructed tubular window raising mechanism of the type described wherein a space-saving connection between adjoining tubes may be provided which may withstand high axial loads and which can, if necessary, be easily detached and again connected.

SUMMARY OF THE INVENTION

Briefly, the present invention may be described as a tubular window driving mechanism particularly for motor vehicles comprising a driving cable for driving a window, a first tube and a second tube having the driving cable extending therethrough, said first and second tubes being arranged with adjoining ends attached to each other, said adjoining ends each being formed with a radially outwardly extending flared collar, and connecting means attaching said adjoining ends together, said connecting means comprising a plastic clamping member consisting of two clamp halves adapted to receive the flared ends of said tubes therebetween and to be clipped together to hold said tubes, said clamp halves each being provided with an inner circumferential groove for receiving therein, respectively, said flared collars.

Thus, in accordance with the present invention, the ends of a pair of tubes which are to be joined together are constructed each with a flared collar which widens radially outwardly of the tube with the collars being surrounded by the plastic clamp which is provided with an inner circumferential groove for each of the collars and which consists of the two clamp halves which are clipped together. The tube ends will be reliably protected against axial sliding movement toward or away from each other in two directions because the collars will be held in the respective grooves. Since this type of connection is independent of the material of the tubes, it is particularly suitable for a case where tubes of different material are to be joined together, such as a plastic tube and a metal tube. Since the clamping member is made only of plastic, the weight of the assembly is reduced and may be maintained relatively low. A special advantage of the tubular window driving mechanism in accordance with the invention involves the fact that the plastic clamp is very easy to manufacture, is an economical part which can be installed without difficulty during assembly since no rivets, screws, or springs are necessary and the assembly may be quickly and easily provided by clipping the clamp halves together.

The clip connection of the present invention may be constructed so as to be detachable in order thereby to enable repeated opening and closing of the plastic clamp.

In a more specific aspect of the invention, the two grooves are separated by means of a radially inwardly projecting web and in this manner the tube ends may be kept at a predetermined distance contributing, for example, to reduction of transmission of vibrations thereby avoiding noise. Each clamp half is preferably formed as an essentially semicylindrical part and a radially outwardly projecting radial flange is provided at the parallel longitudinally extending edges in order to enable contact with a corresponding flange on the other clamp half. The adjacent lateral flanges provide secure mutual contact of the clamp halves.

In order to enable connection of the two clamp halves, simple clamping means are provided which are formed of one clip hook which projects from one of the lateral flanges and which penetrates a clip opening formed in the opposite lateral flange.

In a preferred embodiment of the invention, the clip hooks and clip openings of one clamp half are arranged in such a manner that a clip hook formed in one of the lateral flanges corresponds to a clip opening formed in the other lateral flange with two such clip hooks and clip openings being provided, the openings being symmetrical with respect to the cylinder axis. Because of this symmetry, the two clamp halves may consist of identically shaped structural parts, since the upper clamp half which is rotated with respect to, for example, the lower clamp half by 180° about the cylinder axis has its clip hooks and clip openings exactly above the corresponding clip opening or clip hook of the lower clamp half. This significantly reduces manufacturing costs for the plastic clamps.

In an alternative embodiment of the invention, the two clamp halves are connected by means of a flexible connecting strip having relatively small material thickness formed as a film hinge in the region of the outer edge of the two adjoining lateral flanges. Therefore, the plastic clamp will consist of one part which facilitates assembly since separate parts need not be provided and combined.

In order to facilitate drainage of water or condensation and to reduce corrosion, the plastic clamp is provided with at least one water drainage hole. Such a drainage hole may be provided at the center portion of the clamp half and/or in the region of the lateral flanges of the clamp half wherein in the latter case, the water drainage hole may be formed by means of opposite radial grooves of adjacent radial flanges which in turn makes it possible to manage a single structural shape for the two clamp halves.

In order to improve the mechanical stability of the connection at limited material expenditures, it is further provided in accordance with the present invention that the plastic clamp, or the clamp halves, be reinforced in the region of the two inner circumferential grooves.

It is further contemplated that the plastic clamp may be a sprayed die casting, preferably of polyacetal. Sprayed die castings may be manufactured economically with high accuracy. The polyacetal has high mechanical stability required in automobile structures and is unaffected by changes in temperature.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
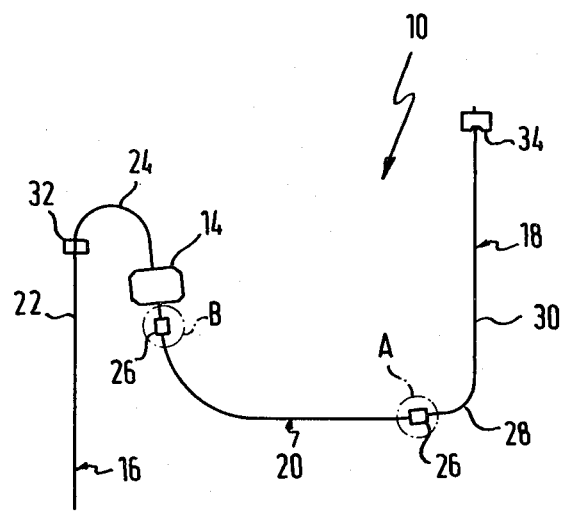
FIG. 1 is a schematic representation of a tubular window actuating mechanism utilizing the present invention.

Referring now to the drawings wherein similar reference characters are utilized to identify similar parts, a tubular window actuating mechanism 10 in accordance with the invention is shown in FIG. 1, with the mechanism 10 being schematically depicted. The mechanism 10 includes a threaded cable 12 which operates as a force transmission or drive member and which is movable in its longitudinal direction by means of a drive mechanism 14 which may be a hand crank or a motor driven device. The threaded cable 12 extends interiorly through a tube arrangement comprising three adjoining tubes. The three adjoining tubes consist of two metal tubes 16 and 18 which are connected together through a plastic tube 20, with the tubes being arranged so that the overall assembly is formed with an approximately Z-shaped configuration as shown in FIG. 1.

The metal tube 16 consists of a straight section 22 adjoined by a bent section 24 which passes through the drive mechanism 14, the bent section in turn ending in the region of Detail B which is similar to Detail A and which comprises a plastic clamp 26 whereby the plastic tube 20 is connected with the metal tube 16.

The plastic tube 20 is also curved and is connected in the region of Detail A by a plastic clamp 26 which is similar to the clamp 26 of Detail B, with the plastic tube 20 at Detail A being thereby joined to the metal tube 18. The metal tube 18 includes a curved section 28 at which the tube 18 is joined with the tube 20, as well as an adjoining straight section 30. The two straight sections 22 and 30 of the tubes 16 and 18 are arranged to extend parallel to each other and they are formed with longitudinal slots (not shown) in order to enable attachment of engaging members 32 and 34 with the threaded cable 12.

The engaging members 32 and 34 may be provided with a lifting rail (not shown) upon which a windowpane may be installed so as to be driven by movement of the engaging members 32 and 34. Due to the Z-shaped configuration of the assembly as shown in FIG. 1, the engaging members 32 and 34 will move in the same direction and generally parallel to each other during displacement of the threaded cable 12. FIG. 1 shows the engaging members 32 and 34 in their uppermost positions. It should be understood that the overall configuration of the window raising mechanism with which the present invention is utilized may be constructed in accordance with prior art and further details thereof are not necessary for an understanding of the invention.

Figure 6:
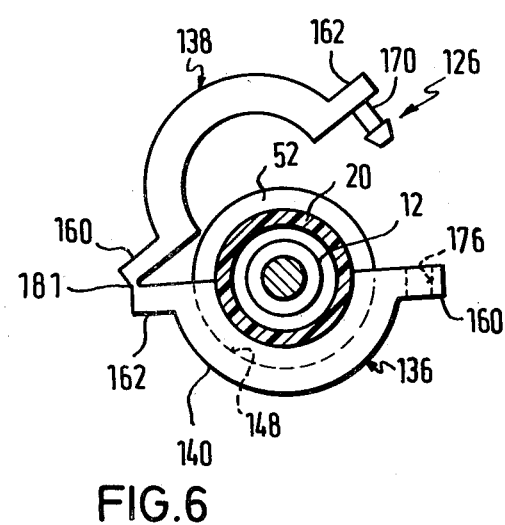
FIG. 6 is a front view of a second embodiment of the plastic clamp of the invention.
Figure 2:
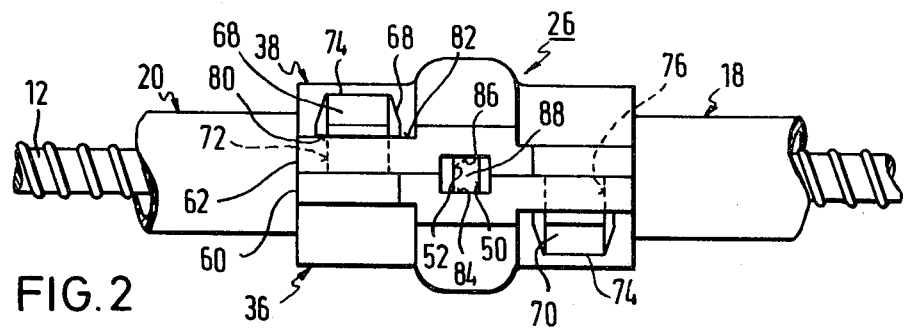
FIG. 2 is a side view showing in greater detail Portion A of FIG. 1 which comprises a platic clamp connecting together a pair of tubes.
Figure 3:
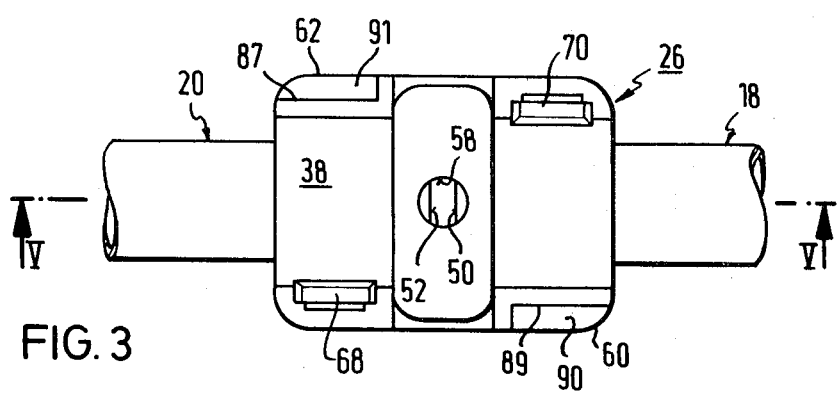
FIG. 3 is a top view of the plastic clamp of FIG. 2.

FIGS. 2–5 show the construction of the plastic clamp 26 which connects together the tubes 16 and 20 and the tubes 20 and 18. The clamp consists of a pair of identical clamp halves, with a lower clamp half 36 and an upper clamp half 38 being provided. Each clamp half has a center portion 40 which has essentially a hollow cylindrical shape which is divided along a cutting plane that contains a cylindrical axis 42 of the overall assembly. In this connection, reference is also made to the second embodiment of the invention which is shown in FIG. 6 which comprises a plastic clamping member 126 having a corresponding center portion 140, this embodiment being discussed in greater detail hereinafter.

The center portion 40 of the clamping member is formed with a cylindrical inner surface 44 which is continuous with the exception of two inner circumferential grooves 46 and 48 which are formed in the region of the longitudinal center of the clamp halves. The inner surface 44 corresponds with the outer diameter of the tubes 16, 18 and 20.

Figure 4:
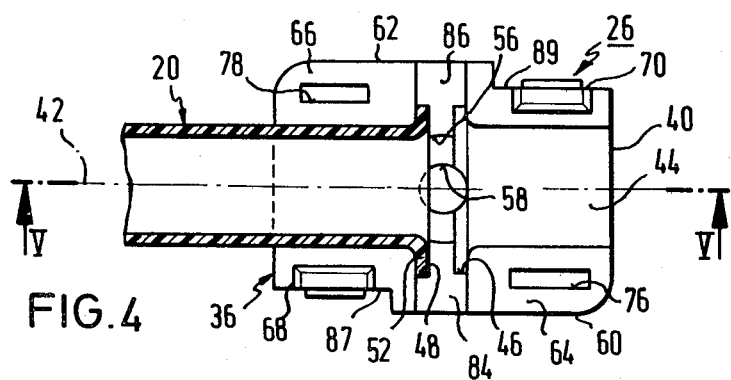
FIG. 4 is a top view of the clamping assembly shown in FIGS. 2 and 3 with the upper clamp half removed.
Figure 5:
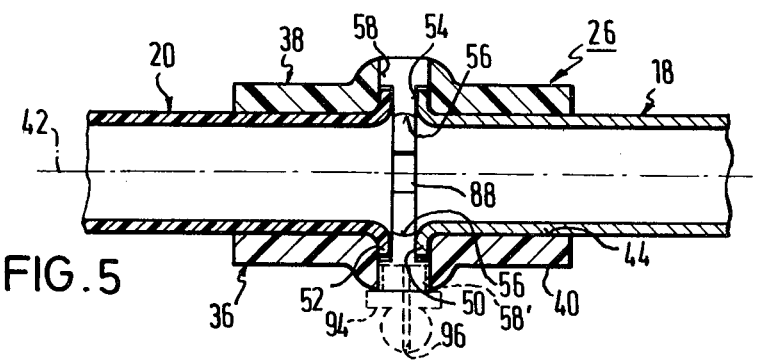
FIG. 5 is a sectional view taken along the line V—V shown in FIGS. 3 and 4.

As best seen in FIGS. 4 and 5, the ends of the tubes 18 and 20 which are adjoining are outwardly widened and are formed with a radially outwardly extending flared collar 50 and 52. The depth and width of the grooves 46 and 48 are adjusted to the outer diameter or material thickness of the collars 50, 52 and a rounded area which is adjusted to the radius of curvature of the respective collar is provided between the grooves 46 and 48 and the cylindrical inner surfaces 44 which adjoin the grooves outwardly thereof.

Therefore, for example, both of the tubes 18 and 20 may be placed into the lower clamp half 36 with the tubes thereby always lying flat with their outer surface at the clamp half 36. Additionally, an end face 54 of a respective one of the collars 50 and 52, which before bending forms an inner circumferential surface for the respective tube, will be circularly annularly shaped and extend perpendicular to the axis 42. This surface or end face 54 will be in contact with a web 56 which projects radially inwardly between the grooves 46, 48. In FIG. 5, the web 56 is not shown in section because at this point it is interrupted by a radially outwardly extending cylindrical water drainage hole 58 (see also FIG. 4).

At the longitudinally extending edges of the clamp half 36, which edges are parallel to the axis 42, there is formed a radially outwardly projecting lateral flange, with a front lateral flange 60 being shown in FIG. 4 and a rear lateral flange 62 also being provided.

With reference to the second embodiment shown in FIG. 6, it will be seen that corresponding lateral flanges 160 and 162 of a plastic clamp 126 are there provided.

The surfaces 64 and 66 of the lateral flanges 60 and 62, which always face the other clamp half, lie in a common plane which contains the cylinder axis 42. In the left part of the lateral flange 60 in FIGS. 2-5 and correspondingly the right part of the lateral flange 62, there is provided a clip hook 68 or 70 which projects upwardly perpendicularly thereto. Each clip hook consists of a shaft 72 and a clip head 74 indicated in FIG. 2 in broken line form.

In the right half of the lateral flange 60 and correspondingly in the left half of the lateral flange 62, there is provided a clip opening 76, 78 (see also FIG. 2) which penetrates the respective flange and having dimensions which are adapted to those of the clip shaft 72. As shown particularly in FIG. 4, the clip hooks and clip openings of the clip half 36 are arranged in such a way that, with regard to both the lateral flanges, each clip hook of one lateral flange is arranged to correspond with a clip opening of the other lateral flange which is symmetrical to the flanges with respect to the cylinder axis 42. Therefore, if the identically shaped upper clamp half 38 is provided onto the lower clamp half 36, then always clip hooks and clip openings will face one another. Both clamp halves 36 and 38, therefore, need only be pressed together after the tubes 18 and 20 have been located in place so that the resilient clip heads 74 will extend through the corresponding clip openings 76, 78 and again widen after contact of the surfaces 64 of the two clamp halves 36 and 38. Automatic loosening of the clamp halves 36, 38 is prevented inasmuch as undercut surfaces 80 which are parallel to the surfaces 64 (see FIG. 2) are provided to rest against the respective undersides 82 of the flanges 60 and 62.

In order to obtain additional drainage possibilities for condensation, water, or the like, the lateral flanges 60 and 62 are constructed in the region of their axial center with radial grooves 84 and 86 which are rectangular in cross section and which lie exactly above one another when the halves 36 and 38 are pushed together thereby to form additional water drainage holes 88.

The clamp halves 36 and 38 are reinforced in the regions of the two grooves 46 and 48 in order to compensate for weakening of the material due to the grooves. Finally, each lateral flange 60 and 62 is constructed in the region of the respective clip hooks 68 and 70 with a radially inwardly offset step 87 or 89. In the assembled plastic clamp 26, a surface area 90 or 91 of the surfaces 64 or 66 of the flange portions which contain the corresponding clip openings remain uncovered (see FIG. 4 at the bottom right or top left) and this facilitates the possible necessary detachment of the clamp halves 36 and 38 from each other.

The plastic clamp 126 shown schematically in FIG. 6 which constitutes the second embodiment of the invention essentially corresponds to the plastic clamp 26 depicted in FIGS. 2-5 with the exception that the two clamp halves are permanently connected by means of a hinge web. The parts of the plastic clamp 126 which correspond to those of the clamp 26 are identified with the same reference numerals except that they are raised by a factor of 100.

As shown in the drawings, the lower clamp half 136 holds the plastic tube 20 wherein the collar 52 will be held by the groove 148, which is indicated in broken line form. The upper clamp half 138 is permanently connected with the lower clamp half by means of the hinge web 181. The hinge web consists of a strip of relatively small thickness, approximately 1 to 2 mm, in the region of the outer edge of the adjoining lateral flanges 162 and 160. The strip or web 181 is, because of its reduced material thickness, flexible in nature and at the same time sufficiently strong to hold the clamp halves together.

In order to close the unitary plastic clamp 126, the clamp halves 136 and 138 need merely be closed after the tubes 18 and 20 have been placed therein, wherein one or several clip hooks 170 will penetrate into corresponding clip openings 176 and finally engage behind the corresponding lateral flange.

The plastic clamps 26 and 126 may be sprayed die castings preferably formed of polyacetal.

It should be noted that in FIG. 5, there may be provided in an alternative embodiment of the invention a lubricating nipple 94 shown in FIG. 5 in broken line which may comprise a threaded separate metal or plastic part engaged into a hole 58' which is also threaded. A central lubricating nipple passage 96 extends into a space between collars 50 and 52 of the tube ends so that lubricant will have unimpeded access to the threaded cable 12 shown in FIG. 2. The lubricating nipple 94 is shown only schematically and may be, for example, constructed with a check valve in case of forced lubrication. In the case of such forced lubrication, an upper hole 58 in FIG. 5 must be closed for example by a blind plug or by an additional lubricating nipple. Depending upon the intended use, the lubricating nipple may also be formed integrally on a respective clamp half 36 or 38.

While specific embodiments of the invention have been shown and described in detail to illustrate the application of the inventive principles, it will be understood that the invention may be embodied otherwise without departing from such principles.

What is claimed is:

1. A tubular window driving mechanism particularly for motor vehicles comprising: a driving cable for driving a window; a first tube and a second tube having said driving cable extending therethrough, said first and second tubes being arranged with adjoining ends attached to each other, said adjoining ends each being formed with a radially outwardly extending flared collar; and connecting means attaching said adjoining ends together; said connecting means comprising a plastic clamping member consisting of two clamp halves adapted to receive said flared ends of said tubes therebetween and to be clipped together to hold said tubes, said clamp halves being each provided with an inner circumferential groove for receiving therein, respectively, said flared collars; said clamp halves being formed each by an essentially hollow semicylindrical center portion having longitudinal edges extending parallel to a cylinder axis of said semicylindrical portion with a radially outwardly projecting lateral flange being provided on each of said edges, with each of said flanges being arranged for contact with a corresponding flange formed on the other of said clamp halves; said two clamp halves being connected together by means of a flexible connecting strip having a relatively thin configuration and arranged in the region of the outer edges of two of said adjacent lateral flanges.

2. A mechanism according to claim 1 wherein said grooves of said clamp halves are separated by means of a radially inwardly projecting web.

3. A mechanism according to claim 1 wherein said clamp halves are clipped to each other by means of at least one clip hook projecting from one of said lateral flanges and penetrating a clip opening of an opposite lateral flange.

4. A mechanism according to claim 1 wherein said plastic clamping member is provided with at least one water drainage hole which opens between said flared collars of said adjoining tube ends.

5. A mechanism according to claim 4 wherein said water drainage hole is formed partially in one of said clamp halves and partially in the other so as to form a completed hole when said clamp halves are joined together.

6. A mechanism according to claim 1 wherein said two clamp halves are reinforced in the region of said inner circumferential grooves.

7. A mechanism according to claim 1 wherein said plastic clamping member is formed as a sprayed die casting.

8. A mechanism according to claim 1 wherein said plastic clamping member is provided with at least one lubricating nipple defining a lubricating nipple passage which discharges between said flared collars of said adjoining ends of said tubes.

* * * * *